United States Patent [19]
Suzuki et al.

[11] Patent Number: 5,563,348
[45] Date of Patent: Oct. 8, 1996

[54] SYSTEM FOR MEASURING STRESS

[76] Inventors: Hideyo Suzuki, 4-13-27-402, Hiyoshi, Kouhoku-ku, Yokohama-shi, Kanagawa-ken; Isamu Yokoi, 1-10-26, Kamagaya, Kamagaya-shi, Chiba-ken, both of Japan; Qing Feng, 7 Whitman Ct., Irvine, Calif. 92715

[21] Appl. No.: 305,189

[22] Filed: Sep. 13, 1994

[30] Foreign Application Priority Data

Sep. 13, 1993 [JP] Japan ................................. 5-227268
Aug. 31, 1994 [JP] Japan ................................. 6-207099

[51] Int. Cl.⁶ ........................... G01B 11/00; G01L 1/00
[52] U.S. Cl. ................ 73/800; 73/581; 73/778
[58] Field of Search ..................... 73/579, 581, 651, 73/775, 778, 800, 826

[56] References Cited

U.S. PATENT DOCUMENTS

| | | | |
|---|---|---|---|
| 2,306,137 | 12/1942 | Pabst et al. | 73/778 |
| 3,052,116 | 9/1962 | Critchley et al. | 73/778 |
| 3,224,279 | 12/1965 | Galli et al. | 73/651 |
| 3,310,978 | 3/1967 | Davis | 73/651 |
| 3,403,548 | 10/1968 | Petrik et al. | 73/581 |
| 3,871,217 | 3/1975 | Miley | 73/581 |
| 4,567,451 | 1/1986 | Greenwood | 73/778 |
| 4,841,256 | 6/1989 | Gastgeb | 73/778 |
| 4,955,238 | 9/1990 | Jones et al. | 73/778 |
| 5,316,562 | 5/1994 | Smithgall et al. | 73/581 |
| 5,381,005 | 1/1995 | Chazelas et al. | 73/800 |

FOREIGN PATENT DOCUMENTS 0875220  10/1981  U.S.S.R. .................. 73/581

OTHER PUBLICATIONS

Catalogue of vibrating wire stressmaster (Model VBS–2). Published by Roctest Ltee Ltd. Montreal, Canada.

*Primary Examiner*—Richard Chilcot
*Assistant Examiner*—George M. Dombroske
*Attorney, Agent, or Firm*—Ronald P. Kananen

[57] ABSTRACT

In a stress measuring, system sensor driving power and a signal sensed by a sensor are transmitted and received in the form of a light pulse signal to thereby improve a noise resistant property as well as a measuring accuracy and reliability. The stress measuring system includes a sensor head disposed at a sensing location and a measuring device disposed at a location remote from the sensing location. The sensor head includes a sensor having a sensing section for sensing a change in stress as a change in the natural frequency of an oscillation string, an output section for outputting a light pulse sensing signal corresponding to the natural frequency sensed by the sensing section and a driving section for causing oscillation at the natural frequency of the oscillation system of the sensing section in response to a driving light pulse signal. The measuring device includes a measuring section for measuring the stress based on the frequency of the light pulse sensing signal and a creating section for creating the driving light pulse signal having the frequency following a change in the natural frequency based on the light pulse sensing signal. The sensor head is connected to the measuring device through optical fibers for transmitting at least the light pulse sensing signal and the driving light pulse signal.

10 Claims, 4 Drawing Sheets

SYSTEM FOR MEASURING STRESS

BACKGROUND OF THE INVENTION

The present invention relates to a stress measuring system capable of measuring stress and strain, and more specifically, to a stress measuring apparatus capable of accurately measuring stress and strain from a remote place through light transmission lines such as optical fibers and the like.

Strain and stress acting on concrete, steel and the like as an object to be measured are measured by a method of directly applying a sensor unit on the object to be measured and a method of using a sensor unit contained in a case. Stress measuring apparatus using these methods employ as the sensing section thereof a strain gauge system, a Carlson system, a differential transformer system, an eddy current system, an optical fiber system, an oscillation string system or the like.

Any of the strain gauge system, the Carlson system, the differential transformer system and the eddy current system is an electric system which converts stress and strain into a minute electric signal by using a physical quantity as a medium.

Further, the optical fiber system makes use of the phenomenon that the light dispersion characteristics of an optical fiber change on receiving stress. Thus, the optical fiber system converts stress into a chance of a quantity of light and measures stress based on the change of the quantity of light.

Further, the oscillation string system is a system which uses a steel wire as an oscillation string and measures stress and strain by determining a tension of the string from the measured number of oscillation and converting the same by making use of a certain relationship existing between a change in tension of the steel wire and the natural frequency of the string.

On the other hand when stress is to be remotely measured by disposing a sensor unit relating to these systems at a desired sensing section, a signal sensed by the sensor unit must be transmitted to a measuring device and further electric power consumed by the sensor unit must be secured. The sensed signal can be transmitted by a method of converting the sensed signal into a light pulse signal and transmitting the signal to the measuring device through an optical fiber. Further, to secure electric power, a method of supplying electric power from the measuring device to the sensor section unit through a power line is usually employed when it is taken into consideration that the sensor unit is buried into an object to be measured.

However, when a conventional electric type sensor unit is employed, since a displacement of an object to be measured and stress based on the displacement are converted into a minute electric signal, electric noise is liable to be mixed with the minute electric signal in locations having a strong electric field and magnetic field such as power plants, substations, factories, and regions where much electric power is used, and the like, thus an accurate measurement is difficult. To improve resistance against noise, countermeasures such as the shield of the sensor unit, a circuit for removing noise from to a sensor signal and the like must be taken. Further, to make measurement at a pinpoint accuracy, calibration must be accurately executed and compensation must be executed according to the length of a lead wire. Therefore, a problem arises in that the sensor unit is increased in size and made complex and a manufacturing cost is increased accordingly.

In particular, since the electric type sensor unit is used for measurement in the vicinity of a flammable material such as oil, gas and the like depending upon a degree of power to be handled thereby, the sensor needs an explosion-proof design against an electric spark and countermeasures of insulation for securing insulation against the exterior of all the electric circuits.

Further, the sensor unit used in the optical fiber system is disadvantageous in an environmental change because when a temperature of the location where the sensor unit is mounted is changed, the characteristics of the sensor are also changed. This is because a change of stress is sensed as a change of a quantity of light. To overcome this drawback, an accurate calibration mechanism must be provided with, for example, a measuring device, which leads to an increase in size and complexity of the apparatus and an increase in cost.

Further, in the case of transmitting a signal sensed by the sensor unit of the aforesaid respective systems to a remote measuring device through an optical fiber, when the sensed signal is transmitted as an optical signal representing a change in a quantity of light, the quantity of light is changed by the change in an environmental temperature in the midway of the transmission, thus an accurate measurement is difficult. On the other hand, when a signal sensed by a sensor unit is transmitted by being converted into an optical pulse signal through an optical fiber, a conversion circuit for converting the sensed signal into the optical pulse signal must be assembled to a sensor unit, although the optical pulse signal is highly resistive against a change in temperature and the like. Thus, when an environmental change of the location where the sensor unit is mounted is taken into consideration, a conversion circuit having a pinpoint accuracy and high shield performance is needed, which eventually leads to an increase in size and complexity of the apparatus and an increase in cost.

Furthermore, in the case of supplying electric power to be consumed by a sensor unit through a power line, when thunders, a strong electric field or a strong magnetic field occur in the environment in the midway of the installation of the power line, electric noise is liable to be invaded into the power line. Thus, there may be a possibility of occurrence of a disadvantage that the sensor unit is burnt out or malfunction is caused by noise energy.

SUMMARY OF THE INVENTION

An object of the present invention made based on the aforesaid problems of prior art is to provide a stress measuring system capable of measuring stress and strain produced to an object to be measured from a remote place at a pinpoint accuracy without being subjected to an adverse effect due to a strong electric field and a strong magnetic field.

Another object of the present invention is to provide a stress measuring system capable of carrying out measurement from a remote location which includes a sensor section from which the occurrence of an electric spark is perfectly or substantially perfectly eliminated and to which an explosion-proof design and insulation design are not necessary.

A further object of the present invention is to provide a stress measuring system capable of carrying out measurement from a remote location which includes a sensor section by which an increase in complexity and high cost of a circuit arrangement can be eliminated.

A still further object of the present invention is to provide a stress measuring system capable of measuring stress from a remote place at a pinpoint accuracy even if an environmental change such as a change of temperature arises.

To achieve the above objects, as one aspect of the present invention, there is provided a system for measuring stress comprising: a sensor head, disposed at a sensing location, incorporating a sensor having a sensing section for sensing a change in stress as a change in a natural frequency of an oscillation system disposed in the sensing section, an output section for outputting a light pulse sensing signal corresponding to the natural frequency sensed by the sensing section, and a driving section for causing oscillation of the oscillation system at the natural frequency in response to a driving light pulse signal of the natural frequency; a measuring device, disposed at a location remote from the sensing location, incorporating a measuring section for measuring the stress based on a frequency of the light pulse sensing signal and a creating section for creating the driving light pulse signal of a frequency following a change in the natural frequency based on the light pulse sensing signal; and light transmission means for transmitting at least the light pulse sensing signal and the driving light pulse signal between the sensor head and the measuring device.

It is preferred that the oscillation system is an oscillation string oscillating mechanically and said sensor head has a body case sensitive to the stress, the oscillation string being stretched to the body case. Preferably, the light transmission means comprises at least two optical fibers individually transmitting the driving light pulse signal and the light pulse sensing signal.

It is preferred that the oscillation system is an LC resonance circuit oscillating electrically and an engaging member for changing the natural frequency of the LC resonance circuit by physically engaging in the LC resonance circuit, and said sensor head has a body case in which a stress sensing section sensing the stress is formed, wherein said engaging member is coupled with the stress sensing section.

DESCRIPTION OF THE PREFERRED EMBODIMENTS

Embodiments of the present invention will be described with reference to the accompanying drawings.

(First Embodiment)

First, a first embodiment will be described with reference to FIGS. 1 and 2.

Figure 1:
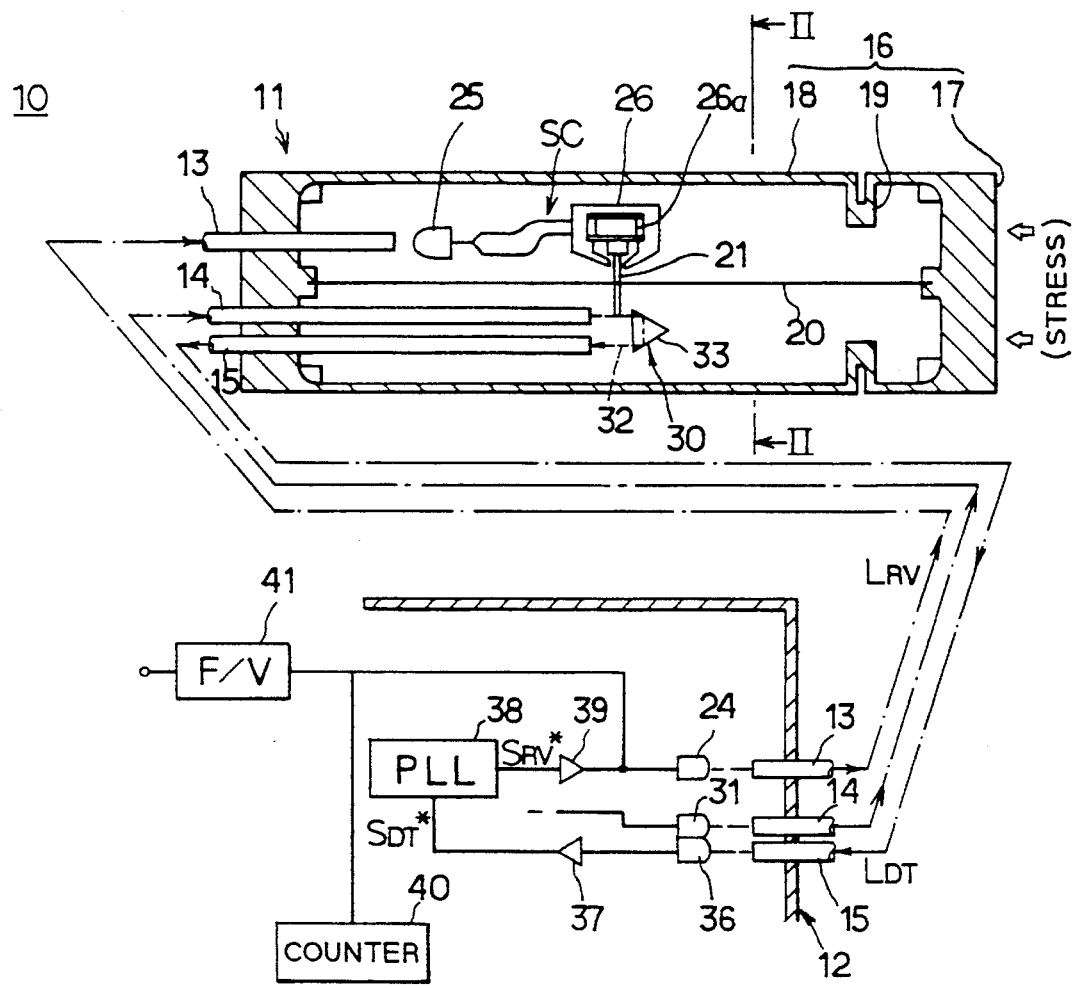
FIG. 1 is an overall arrangement view showing the outline of an oscillation string type stress measuring system according to a first embodiment of the present invention.

FIG. 1 is an overall schematic arrangement view showing an example of an oscillation string type stress measuring system according to the first embodiment.

The oscillation string type stress measuring system 10 includes a sensor head 11 constituting an oscillation string type stress meter and a measuring device 12 constituting stress measuring means and the former is connected to the latter by three optical fibers 13, 14, 15 as light transmission means for drive and signal. The sensor head 11 is mounted on concrete, steel and the like as an object to be measured, whereas the measuring device 12 is disposed in an observation room and the like at a remote location to thereby remotely measure stress and strain acting on the object to be measured.

The sensor head 11 has a hollow cylindrical, for example, cylindrical main body case 16, and a stress sensing section 17 is provided in the main body case 16. The stress sensing section 17 is formed by being exposed to one of the extreme ends of the main body case 16 and integrally or as if integrally formed with a case main body portion 18 through a flexible portion 19 having elasticity.

The main body case 16 contains an oscillation string type sensor SC. As shown in FIG. 1, the sensor SC includes an oscillation string 20 composed of a wire such as a steel wire or the like, a shutter 21 serving as a sensor of oscillation and an iron piece for an electromagnet to be described later, a light receiving diode 25 for photoelectric conversion and an electromagnet 26 for applying oscillation. In these components, the oscillation string 20 is stretched between the base portion (the left side in FIG. 1) of the main body case 16 and the stress sensing section 17. The oscillation string 20 is composed of a material which has a coefficient of linear expansion equal to or approximating to that of the main body case 16. For example, a material such as Inver, YNiC alloy, Elinver, Koelinvar, Iso-elastic, Metelinver etc. are used as the material.

Figure 2:
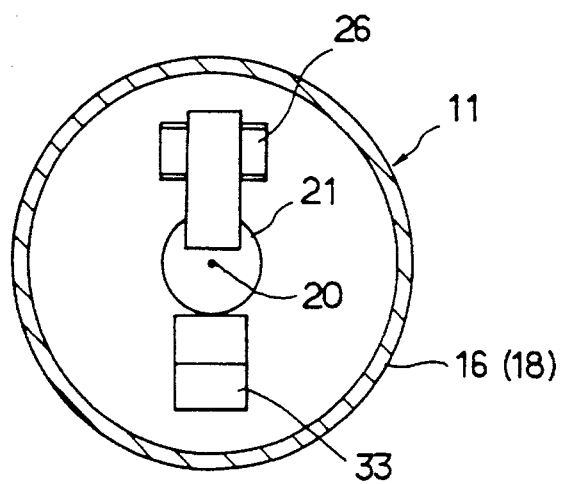
FIG. 2 is a cross sectional view taken along the line II—II in FIG. 1.

As shown in FIG. 2, the shutter 21 is formed into a disk shape so as to prevent the deterioration of a shutter function caused by the distortion of the oscillation string 20 and mounted at the antinode (the central portion) of, for example, the primary oscillation mode of the oscillation string 20 in the state that the oscillation string 20 passes through the shutter 21.

Further, the electromagnet 26a includes an exciting coil 26 and a movable iron piece, i.e., the shutter 21 which can be moved by an electromagnetic force caused by the excitation of the exciting coil 26a. The output terminal of the light receiving diode 25 is connected to the exciting coil 26a through a very short lead wire as well as the light receiving surface of the light receiving diode 25 confronts the extreme end for radiation of the driving optical fiber 13 which is inserted through the base portion of the main body case 16. With this arrangement, since a light pulse signal (intermittent light pulse signal) transmitted from the measuring device 12 through the optical fiber 13 is converted into an electric pulse signal by the light receiving diode 25, the exciting coil 26a of the electromagnet 26 is pulse excited by being supplied with an AC current. Therefore, the iron piece, i.e., the shutter 21, is oscillated to apply driving oscillation to the oscillation string 20 so that the oscillation string 20 is resonated and oscillation is maintained at a constant natural frequency. The optical fiber 13 is formed to have a diameter of 50–300 μm, for example, a core diameter of 100 μm and an outside diameter of about 250 μm. A collimator lens may be provided at the output end of the optical fiber 13 as necessary to improve a light transmission efficiency.

Further, an oscillation sensing light pass 32 for sensing the oscillation of the oscillation string 20 is formed at a location confronting the shutter 21 in the main body case 16. The oscillation sensing light pass 32 is a light path for connecting the output end of the transmitting optical fiber 14 partially inserted into the base portion of the main body case 16 to the input end of the receiving optical fiber 15, and a right angle prism 33 is provided in the midway of the light path 32 so as to reverse an oscillation sensing light (light having a definite amplitude which does not change with time) output from the output end of the optical fiber 14 and supply the oscillation sensing light to the input end of the optical fiber 15. That is, there is formed a light path by the right angle prism 33 though which the oscillation sensing light transmitted from the measuring device 12 through the optical fiber 14 turns back in the main body case 16 and returns through the optical fiber 15 again.

The shutter 21 is disposed in the light path portion between the output end of the optical fiber 14 and the right angle prism 33 in the oscillation sensing light path 32 so that the shutter 21 can intermit the light path 32 according to the oscillation of the oscillation string 20. Consequently, when the oscillation string 20 oscillates, the oscillation sensing light transmitted through the light path 32 is converted into an intermittent light in proportion to the number of oscillation of the oscillation string and the intermittent light is transmitted to the measuring device 12 through the receiving optical fiber 15.

Note that an optical system composed of a mirror, lens, coupler and the like may be used in place of the prism 33, and when such an optical system is used, a desired arbitrary light path for sensing oscillation can be formed in the main body case 16. Further, a transmission efficiency of an oscillation sensing light on the oscillation sensing light path 32 may be improved by a collimator lens provided at the output end of the transmitting optical fiber 14.

On the other hand, as shown in FIG. 1, the measuring device 12 includes a resonance sensing phase lock loop (PLL) circuit 38, a light emitting diode 24 connected to the phase lock loop circuit 38 through an amplifier 39 and a light emitting diode 31 and a light receiving diode 36 disposed in confrontation with the input end of transmitting optical fiber 14 and the output end of the receiving optical fiber 15, respectively.

With this arrangement, a light pulse signal transmitted through the receiving optical fiber 15 is converted into a pulse voltage by the light receiving diode 36 as photoelectric conversion means and input to the phase lock loop circuit 38 though an amplifier 37 for signal processing. The phase lock loop circuit 38 forms a capture range digital type resonance circuit composed of an IC substrate. Thus, an output pulse signal resonating to the frequency of a pulse signal which is input to the phase lock loop circuit 38 is instantly output from the phase lock loop circuit 38 to the light emitting diode 24 through the amplifier 39. Therefore, the light emitting diode 24 can supply a light intermittent pulse signal corresponding to the pulse signal to the driving optical fiber 13.

At the beginning of start of the oscillation string type stress measuring system 10, a pulse voltage having a central frequency (designed frequency) approximating to a natural frequency of the oscillation string 20 is output from the phase lock loop circuit 38 constituting a phase lock loop, and a driving light pulse corresponding to the pulse voltage is supplied to the sensor head 11. When the exciting coil 26a is pulse excited by receiving the light pulse signal, oscillation is applied to the oscillation string 20. The natural frequency of the oscillation string 20 is previously measured and known.

Further, in the measuring device 12, the output terminal of the amplifier 39 is connected to a frequency counter 40 and a frequency/voltage (F/V) converter 41. With this arrangement, a signal output from the phase lock loop circuit 38 is partially branched and input to the frequency counter 40 to count and display an oscillation frequency as well as output from the frequency/voltage converter 41 as an analog signal.

Next, overall operation of the oscillation string type stress measuring system will be described.

The stress measuring system makes use a certain relationship which exists between the natural frequency and the tension of the oscillation string 20. When stress acting on the stress sensing section 17 of the main body case 16 is transmitted to the oscillation string 20, the tension of the oscillation string 20 changes and thus the natural frequency thereof also changes, so that the frequency is converted into a light pulse signal, and stress and strain can be determined from the frequency of the light pulse signal.

In general, the relationship between the tension acting on the oscillation string 20 of the main body case 16 and the natural frequency is represented by the following formula.

$$f = \frac{1}{nL} \sqrt{\frac{P \cdot g}{\rho \cdot S}} \qquad (1)$$

where,
f: frequency of oscillation string,
n: constant (2, 1, $\frac{2}{3}$, ... 2/i, ...) corresponding to order of oscillation mode,
L: length of oscillation string,
P: tension of oscillation string,
$\rho$: density of oscillation string, and
S: cross sectional area of oscillation string.

From the formula (1), the following relationship is established between the natural frequency f of the oscillation string 20 and the tension (i.e., stress) P of the oscillation string 20.

$$f = K \cdot \sqrt{P} \qquad (2)$$

where, K is a constant of proportion.

From the formula (2), the tension P of the oscillation string 20, i.e., stress acting on the stress sensing section 17, can be measured by sensing a change in the natural frequency of the oscillation string 20.

Specifically, the oscillation string 20 stretched in the main body case 16 has a certain natural frequency $f_0$ based on a tension $T_0$ at the time in the state that no stress is applied to the stress sensing section 17. Thus, a pulse light $L_{RV}$ transmitted from the measuring device 12 to the sensor head 11 through the driving optical fiber 13 is converted into a quantity of electricity by the light receiving diode 25 and the electromagnet 26 is pulse excited by the electric energy so that oscillation is applied to the shutter 21. The frequency at this time is caused to conform with the natural frequency $f_0$ of the oscillation string 20 without stress in its equilibrium state by the phase lock loop function of the phase lock loop circuit 38 of the measuring device 12 and the oscillation string 20 continues oscillation at the frequency $f_0$.

In the no stress state, since the shutter 21 intermits the oscillation sensing light path 32 at the frequency $f_0$, a light signal with a definite amplitude transmitted from the transmitting optical fiber 14 is converted into a light pulse $L_{DT}$ having the frequency $f_0$ which is fed back through the receiving optical fiber 15. The light pulse signal $L_{DT}$ is converted into a quantity of electricity by the light receiving diode 36 and amplified by the amplifier 37 so that it becomes a corresponding electric pulse signal $S_{DT}*$. In an equilibrium state without stress, since there is no phase difference between a light pulse signal $S_{RV}*$ generated by the phase lock loop circuit 38 and a fed-back light pulse signal $S_{DT}*$, this equilibrium state is maintained. Consequently, the counter 40 of the measuring device 12 displays the frequency $f_0$ in the equilibrium state and the frequency/voltage converter 41 outputs an analog value corresponding to the frequency $f_0$ to a not shown recorder and the like.

When stress is applied to the stress sensing section 17 of the sensor head 11 in the no stress state, the tension of the oscillation string drops from $T_0$ to $T_1$ rapidly, for example and the natural frequency also drops from $f_0$ to $f_1$ accordingly. The number of intermitting operation of the shutter 21 is rapidly reduced by the drop of the frequency, so that the frequency of the light pulse signal $L_{DT}$ transmitted from the oscillation sensing light path 32 to the measuring device 12 through the optical fiber 15 also drops to $f_1$. The light pulse signal $L_{DT}$ is formed into a pulse signal $S_{DT}*$ of a quantity of electricity by the light receiving diode 36 and the amplifier 37 and input to the phase lock loop circuit 38. In this case, since there is a phase difference between a pulse signal $S_{RV}*$ (frequency=$f_0$) generated by the phase lock loop circuit 38 and a fed-back pulse $S_{DT}*$ (frequency=$f_1<f_0$), the phase lock loop circuit 38 instantly corrects the frequency of the generated pulse signal $S_{RV}*$ to $f=f_1$ to make the phase difference zero. That is, the driving pulse signal $S_{RV}*$ following the change in the frequency of the oscillation string 20 is generated by the phase lock loop circuit 38, so that an effective closed loop resonance system is formed by the stress measuring system as a whole.

Further, the pulse signal $S_{RV}*$ generated by the phase lock loop circuit 38 actually conforms with the natural frequency $f$ ($=f_1$) of the oscillation string 20 corresponding to the instant value of an external force (stress). The frequency $f$ ($=f_1$) is counted and displayed by the counter 40 as well as converted into an analog value by the frequency/voltage converter 41, whereby a magnitude of stress is dynamically observed.

As described above, the oscillation string type stress measuring system 10 of this embodiment arranges the closed loop using a light pulse between the measuring device and the sensor head so as to drive the oscillation string at the natural frequency at all times so that a change in the frequency of the oscillation string caused by a change in stress is directly captured as a change in the frequency of the light pulse to thereby receive the change in the frequency by a light pulse. As a result, the system 10 has various advantages which are not conventionally provided.

First, in the stress measuring system 10, the main body case 16 is composed of a material which has a coefficient of linear expansion equal to or approximating to that of the material of the oscillation string 20. Further, since the driving and receiving optical fibers 13, 15 are used to transmit and receive a light pulse, the measuring system 10 is not subjected to an adverse effect due to a change in temperature in the environment including the mounting location of the sensor head. Therefore, it is not necessary to provide a calibration mechanism of pinpoint accuracy, which is conventionally needed, with the measuring device, which contributes to the miniaturization, simplification and cost reduction of the system.

Further, a conventionally needed countermeasure such as a conversion circuit assembled to the sensing section to convert a sensed signal into a light pulse signal is not necessary, by which the miniaturization, simplification and cost reduction of the sensor head can be made possible.

Since the stress measuring system 10 employs optical fibers as light transmission means for driving power and signals and transmits them optically, they can be transmitted without being subjected to the effect of a strong electric field and a strong magnetic field. Therefore, the damage of the sensor head and the like and the malfunction of the system due to the falling of a thunderbolt and the like can be prevented as well as stress can be measured at a pinpoint accuracy by eliminating the invasion of the noise caused by them. Moreover, the shield of the sensor head and a noise eliminating circuit for preventing the invasion of the noise are not needed.

Since the sensor head is driven by a light signal and directly generates a light pulse signal, the sensor head does not generate an electric spark which is generated when an electric sensor is employed. Thus, the sensor head can execute measurement in the vicinity of a flammable material such as oil, gas and the like as it is without the need of an explosion-proof design and a countermeasure for insulation which leads to an increase in size and cost.

When the stress measuring system 10 has a pressure sensing jig provided at the output thereof, the system can be applied to the measurement of a water pressure and a soil pressure, and when combined with a mechanical vibration principle, the system 10 can be applied to an accelerometer and a speed meter.

(Second Embodiment)

A second embodiment of the present invention will be described with reference to FIG. 3.

The second embodiment is also embodied in an oscillation string type stress measuring system, and in particular, relates to the arrangement of a plurality of sensor heads connected through a multi-stage. Note, in the second embodiment, the same numerals as used in the first embodiment are used to denote the components substantially similar to those of the first embodiment and the description of the components is omitted or simplified.

Figure 3:
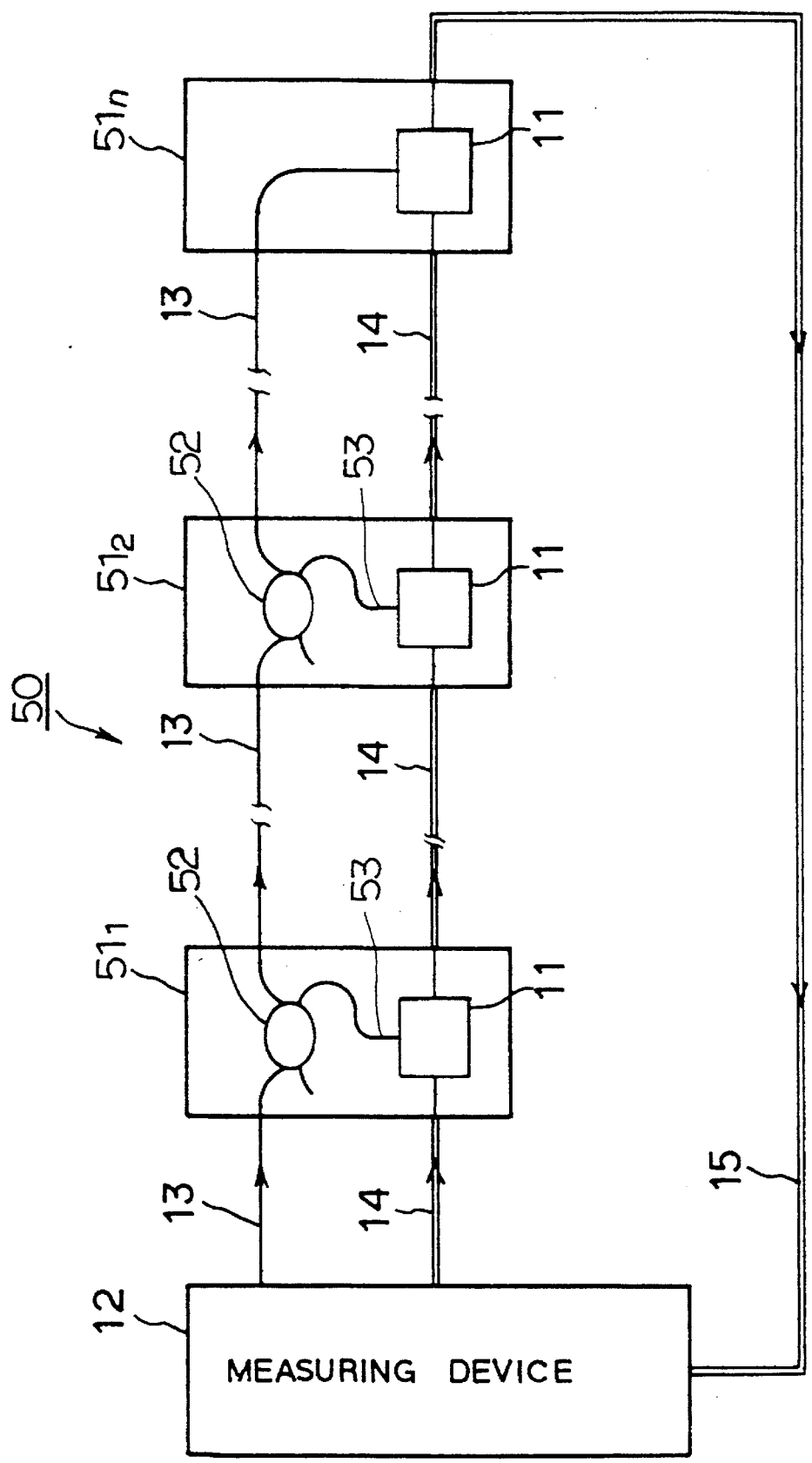
FIG. 3 is a block diagram of an oscillation string type stress measuring system having sensor heads connected by a multi-stage base according to a second embodiment of the present invention.

An oscillation string type stress measuring system 50 shown in FIG. 3 includes a plurality (e.g., 5 sets, 10 set etc.) of oscillation string type stress meters $51_1 \ldots 51_n$ on each of which each of a plurality of sensor heads 11 . . . 11 is mounted and a single set of a measuring device 12 constituting stress measuring means.

Each of a plurality of the stress meters $51_1 \ldots 51_n$ is installed at, for example, a different remote sensing location and provided with a light distributer (light coupler) 52 having one input and two outputs except the stress meter $51_n$ connected to a final stage.

A driving optical fiber 13 extending from the measuring device 12 is connected to the input of the optical distributer 52 in the first stage stress meter $51_1$ and one of the two outputs of the optical distributer 52 is connected to its sensor head 11 through an optical fiber 53 as well as the other of the two outputs is connected to the input of the light distributer 52 in the second stage stress meter $51_2$ passing again through the driving optical fiber 13. The stress meter $51_2$ is also connected in the same way as the first stage stress meter $51_1$. Thereafter, the optical fiber 13 is successively connected to the stress meters $51_3$- $51_n$ of the following stages in the same way. Since the stress meter $51_n$ of the final stage is not provided with the light distributer, the optical fiber 13 is directly connected to the sensor head 11. Note, in each of the stress meters $51_1$ ($-51_{n-1}$) except the stress meter $51_n$ in the final stage, the output end of the optical fiber 53 for internal connection is connected to the light receiving diode 25 used to convert driving power shown in FIG. 1 (refer to FIG. 1).

Further, as shown in FIG. 3, a transmitting optical fiber 14 extending from the measuring device 12 is successively connected in series to the sensor heads 11 of the stress meters $51_1$-$51_n$, and a feed-back (receiving) optical fiber 15 is connected from the sensor head 11 of the final stage stress meter $51_n$ to the measuring device 12.

Each light distributer 52 makes optimum distribution of light energy to that used by the sensor head 11 of its own stress meter $51_1$(... $51_{n-1}$) and that used by the sensor heads 11 at the following stages. With this arrangement, the driving light energy is distributed to the sensors 11 at the respective stages in a suitable amount to thereby drive the respective sensor heads 11.

Further, the oscillation strings 20 provided in the sensor heads 11 ... 11 of the stress meters $51_1$-$51_n$ at the respective stages have tensions which can be individually adjusted so that the natural frequency of the oscillation strings 20 which is different at each stage can be set by the adjustment of the tensions. In this case, the natural frequency at the respective stages when no stress is applied is selected so that the bands of the natural frequency of the sensor heads at the respective stages do not overlap to each other even if the frequency is increased or decreased in a maximum amplitude by the application of stress of a prescribed maximum value to the sensor heads 11.

A plurality of the stress meters $51_1$-$51_n$ are successively and individually driven at a high speed by making use of, for example, that the bands of the set natural frequency are different from each other. With this arrangement, it can be easily discriminated that stress is applied to any of the stress meters $51_1$ ( ... $51_n$) by the observation of the frequency of a light pulse signal fed back to the measuring device 12 from the same optical fiber 15, and moreover the magnitude of the stress can be calculated from an amount of change in the frequency.

Note, when the measuring device 12 is provided with a mechanism for optically or electrically and individually extracting signals of the bands of the set natural frequency of a plurality of the stress meters $51_1$-$51_n$ from the composite signal composed of the signals, a plurality of the stress meters $51_1$-$51_n$ can be simultaneously driven and stresses at a plurality of locations can be simultaneously measured.

As described above, according to the present embodiment, since a plurality of the oscillation string type stress meters can be observed by the single set of the common measuring device as well as since the sensor heads 11 at the respective stages need not be individually connected by the three optical fibers (one for driving and two for signals) 13, 14, 15, the arrangement of connection can be greatly simplified.

Since the oscillation string type stress measuring system of the present invention is arranged by paying attention to that the tension of the oscillation string is changed by stress acting on the stress sensing section of the sensor head and the natural frequency of the oscillation string is changed accordingly, the measuring device can remotely measure a change in the natural frequency of the oscillation string by means of a light pulse signal through the light transmission lines such as the optical fibers and the like. As a result, the stress measuring system can be used to measure stress, strain, soil pressure and water pressure at a pinpoint accuracy in the remote stress measurement of concrete dam, filled dam, tunnel, underground power plant, road, runway, foundation pile, caisson, quay, reclaimed land, developed land, dock, waterway, shield frame, underpinninig, sheathing, tentative coffering, blast furnace, nuclear furnace, landslide and the like.

Note, in the description of the aforesaid respective embodiments, although an example is shown in which the transmitting optical fiber 14 and the receiving optical fiber 15 are independently provided as light transmission means, a light signal may be transmitted and received through a single optical fiber by employing such an arrangement that both the optical fibers are commonly used and transmission and reception are selectively diverted on the measuring device side.

The three optical fibers 13, 14, 15 are individually provided as the light transmission means in the description of the aforesaid respective embodiments. However, when a light signal transmitted from the driving optical fiber 13 is converted into an electric signal in the sensor head 11, the electric signal is smoothed and a light source having a definite amplitude is obtained by using the smoothed electric signal, the sensor head 11 can be provided with the light source and the transmitting optical fiber 14 can be omitted.

(Third Embodiment)

Figure 4:
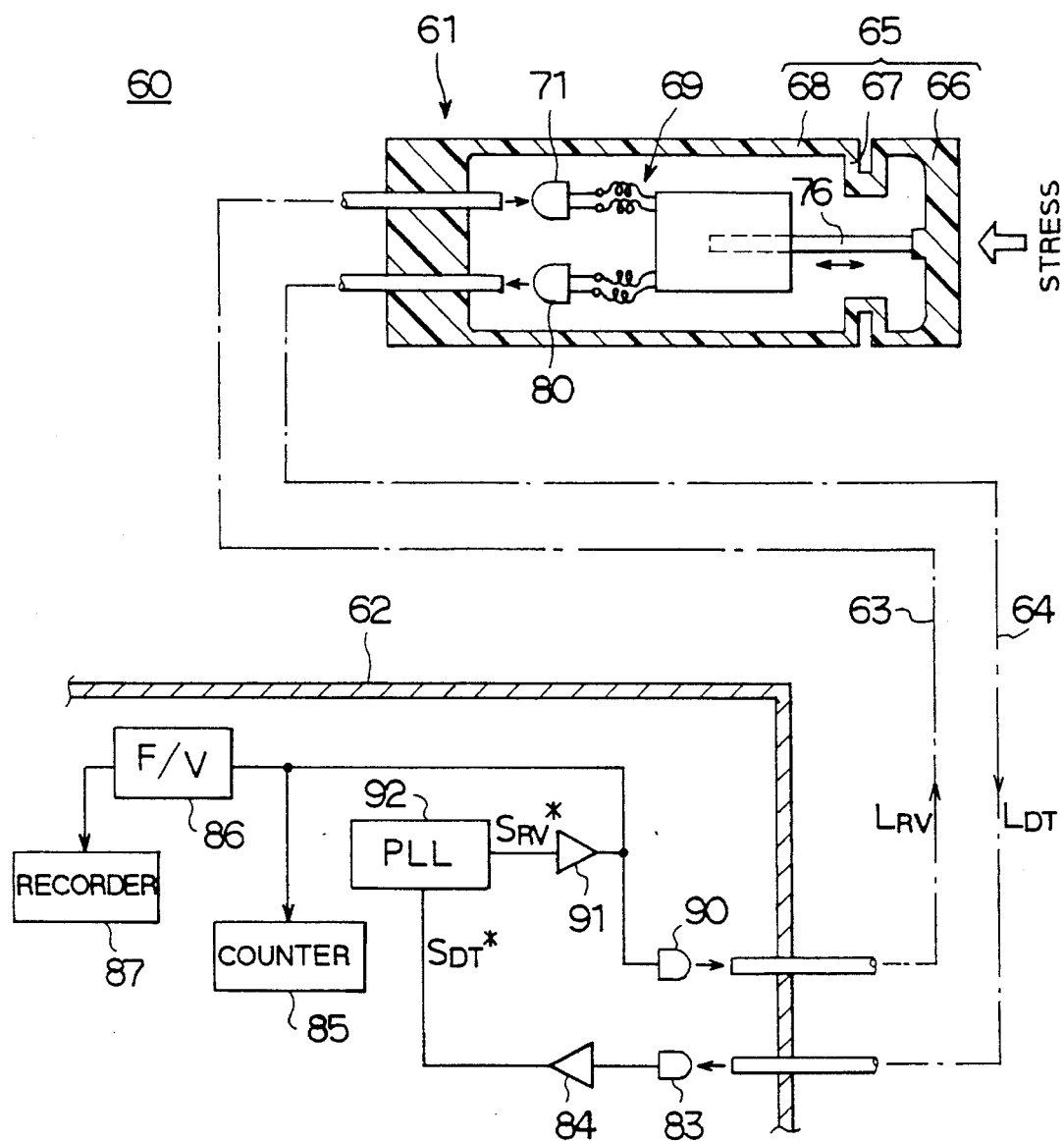
FIG. 4 is an overall arrangement view showing the outline of a resonance circuit type stress measuring system according to a third embodiment of the present invention.

A third embodiment of the present invention will be described with reference to FIG. 4 and FIG. 5. The third embodiment is embodied in a stress measuring system for measuring stress from a remote location of a type whose oscillation system of the sensor of a sensor head is composed of an electric resonance circuit (hereinafter, referred to as "resonance circuit type"). FIG. 4 schematically shows the overall arrangement of the stress measuring system.

The resonance circuit type stress measuring system 60 includes a sensor head 61 mounted on an object to be measured which is positioned at a stress sensing location and a measuring device 62 installed in an observation room as a remote measuring location, and they are connected to each other through two driving and signal optical fibers 63, 64. As shown in FIG. 4, the aforesaid two driving and signal optical fibers 63, 64 pass through the base portion of the main body case 65 of the sensor head 61.

The sensor head 61 includes the hollow cylindrical main body case 65 and a stress sensing section 66 is formed at one of the extreme ends of the main body case 65 by being exposed thereto. The stress sensing section 66 is integrally or as if integrally formed with a case main body portion 68 forming the central portion and the other end of the main body case 65 through a flexible portion 67 having elasticity.

The main body case 65 contains a "resonance circuit type" sensor 69. As shown in FIG. 5, the sensor 69 includes a sensor main body 70 constituting an electric type "exciting circuit for displacement/electric conversion" and a light receiving diode 71 for photoelectric conversion connected to the sensor main body 70. The output surface of the driving optical fiber 63 is disposed in confrontation with the light receiving diode 71. The sensor main body 70 is further provided with an LC resonance circuit 75 having a solenoid type coil 74. A driving excitation pulse signal, which is obtained by the light receiving diode 71 converting a light pulse signal into a quantity of electricity, is supplied to the LC resonance circuit 75.

The LC resonance circuit 75 is resonated at the natural frequency (resonance frequency) at the time by being excited by the excitation pulse signal, as described later. In this embodiment, the natural frequency is made variable by the adjustment of the inductance of the coil 74 constituting a portion of a circuit constant. That is, a bar-shaped rod 76 as an engaging body whose one end is connected to the stress sensing section 66 as shown in FIG. 4 has the other end which is advancingly and retractingly inserted into the coil 74. When stress is applied to the stress sensing section 66, an amount of insertion of the rod 76 into the coil 74 is changed in accordance with an amount of the stress, whereby the permeability of the coil 74 is changed to thereby change the inductance, thus the natural frequency is also changed. That is, the natural frequency of the LC resonance circuit 75 is changed according to an amount of insertion of the rod 76, in other words, according to a magnitude of stress.

Figure 5:
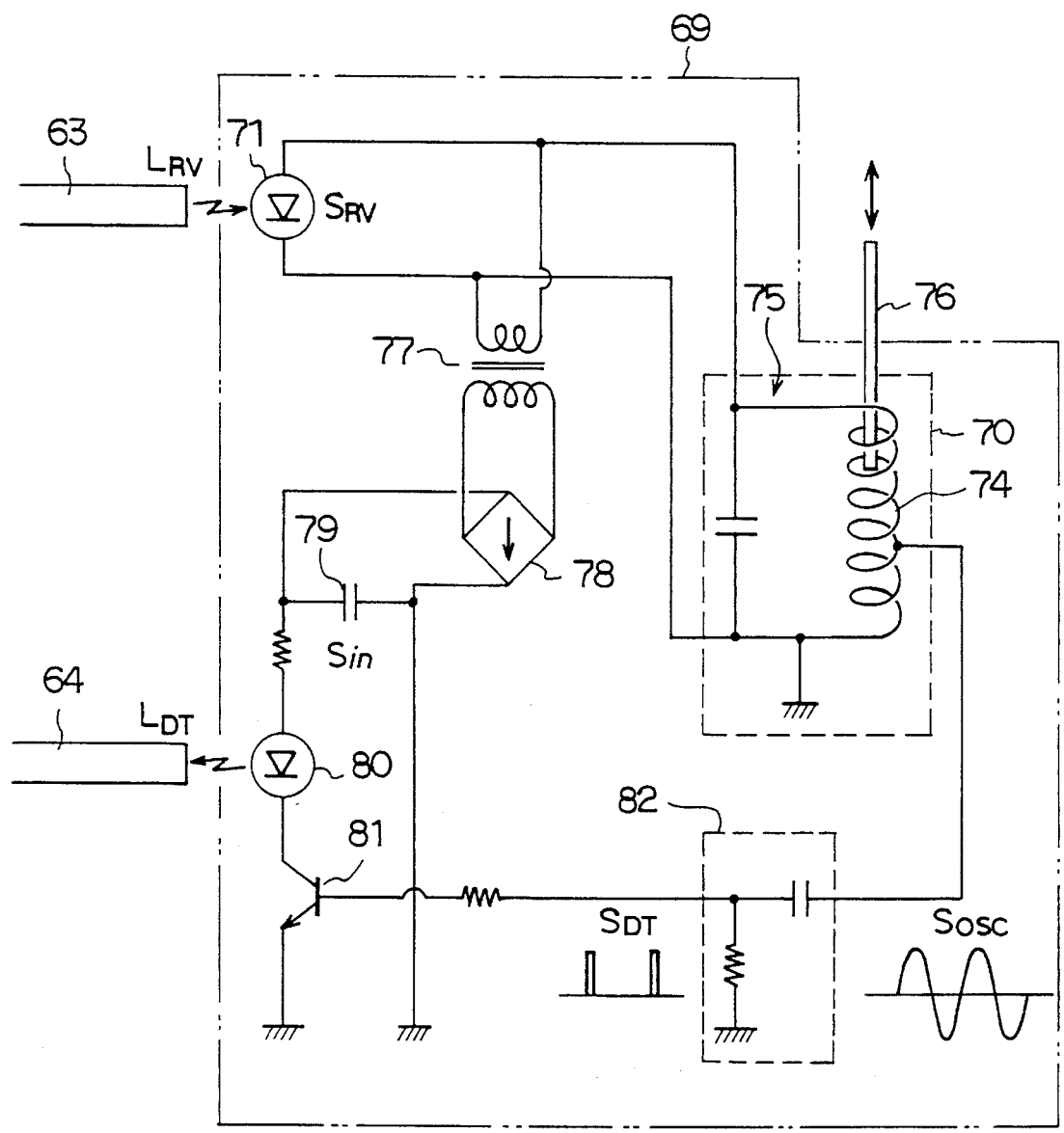
FIG. 5 is a block diagram showing a sensor in FIG. 4.

As shown in FIG. 5, the sensor 69 includes a transformer 77 connected to the light receiving diode 71 in parallel with the sensor main body 70, a rectifying circuit 78 for rectifying a secondary output of the transformer 77, a smoothing capacitor 79 for smoothing the rectified output from the rectifying circuit 78 and a light emitting diode 80 capable of receiving a light in receipt of a smoothing output $S_{in}$ from the smoothing capacitor 79 as well as a switching transistor 81 capable of turning on and off the supply of a smoothing output to the light emitting diode 80 according to a switching signal and a differential circuit 82 inserted between the switching transistor 81 and the coil 74.

As a result, the electric energy received and converted by the light emitting diode 71 is partly extracted and rectified and supplied to the light emitting diode 80. That is, the sensor 69 diverts a light pulse signal supplied as a driving light pulse signal and creates power necessary to emit light by itself. On the other hand, a sinusoidal resonance output signal $S_{osc}$ taken out from the coil 74 is converted into a square-wave pulse signal $S_{DT}$ having a small duty ratio by the differential circuit 82. Since the pulse signal $S_{DT}$ is supplied to the switching transistor 81 as a switching signal, the transistor 81 is turned on during only the rising-up period of the pulse signal $S_{DT}$ and emits light by being conducted with the aforesaid rectified output. That is, the light emitting diode 80 converts the differentiated pulse signal $S_{DT}$ into a light pulse signal corresponding to the signal $S_{DT}$. Since the input end of the signal optical fiber 64 confronts the light emitting surface of the light emitting diode 80, the converted light pulse signal is extracted by the optical fiber 64.

On the other hand, as shown in FIG. 4, the input end of the driving optical fiber 63 confronts a light emitting diode 90 in the measuring device 62 and the output end of a phase lock loop circuit 92 into which a PLL circuit is assembled is connected to the light emitting diode 90 through an amplifier 91. A light receiving diode 83 confronts the output end of the signal optical fiber 64 and an output from the light receiving diode 83 is input to the input end of the phase lock loop circuit 92 through an amplifier 84. The output terminal of the phase lock loop circuit 92 is connected to a frequency counter 85 in addition to the light emitting diode 90 through the amplifier 91 as well as to a recorder 87 through a frequency/voltage converter 86.

With this arrangement, a light pulse signal $L_{DT}$ corresponding to the sensing electric pulse signal $S_{DT}$ which is supplied from the sensor head 61 through the signal optical fiber 64 is returned to an electric pulse signal $S_{DT}^*$ again by the light receiving diode 83 and input to the phase lock loop circuit 92. The phase lock loop circuit 92 instantly adjusts the frequency of a generated pulse signal $S_{RV}^*$ so that a phase difference between the input signal $S_{DT}^*$ and the generated pulse signal $S_{RV}^*$ in the same way as the first embodiment. The generated pulse signal $S_{RV}^*$ is converted into a corresponding light pulse signal $L_{RV}$ by the light emitting diode 90 and transmitted to the sensor head 61 through the driving optical fiber 63.

Consequently, according to the arrangement of this embodiment, when no stress is applied to the stress sensing section 66 of the sensor head 61, a resonance output signal $S_{osc}$ having the natural frequency which is determined by a predetermined amount of insertion of the rod is obtained and a light pulse signal $L_{DT}$ corresponding to the output signal $S_{osc}$ is transmitted to the measuring device 62 through the optical fiber 64. As a result, the phase lock loop circuit 92 of the measuring device 62 instantly responds to a fed-back signal $S_{DT}^*$ corresponding to the light pulse signal $L_{DT}$ and is equilibrated by the application of phase lock loop so that the phase lock loop circuit 92 outputs the generated signal $S_{RV}^*$ having the same frequency. The generated signal $S_{RV}^*$ is measured by the frequency counter 85 at real time as well as converted into an analog value by the frequency/voltage converter 86 and recorded. The generated signal $S_{RV}^*$ at this time is also supplied to the sensor head 61 through the driving optical fiber 63 as a corresponding light pulse signal $L_{RV}$ so that exciting energy of a quantity of electricity is supplied to the LC resonance circuit 75 and power is supplied to the light emitting diode 80. As a result, the LC resonance circuit 75 can be continuously resonated at the natural frequency at the time. This equilibrium state is continued as it is unless stress is applied.

When stress is applied to the stress sensing section 66, however, an amount of insertion of the rod 76 into the coil 74 is changed so that a resonance frequency of the sensor main body 70 is changed in accordance with the change of the inserted amount. With this operation, a resonance signal $S_{osc}$ ($=S_{osc}$ 1) corresponding to the change in the natural frequency is transmitted to the phase lock loop circuit 92 of the measuring device 62 through a light pulse signal in the same way as the aforesaid. Therefore, the phase lock loop circuit 92 executes phase lock loop according to the changed bed-back signal $S_{DT}^*$ ($=S_{DT}1^*$) so that a generated signal $S_{RV}^*$ ($S_{RV}$ 1*) following the fed-back signal is created. The generated signal $S_{RV}1^*$ is returned to the sensor head 61 as a driving signal in the same way as the aforesaid as well as the frequency and analog value of the signal are displayed on the counter 85 and the recorder 87. With this arrangement, a magnitude of stress can be observed substantially at real time.

Therefore, stress produced at a desired sensing location can be accurately measured from a remote place also by the resonance circuit type stress measuring system. In particular, since a closed loop is formed between the sensor head and the measuring device so that the sensing of stress and light pulse conversion accompanied by the stress sensing are simultaneously carried out as well as the optical fibers as light transmission means are used for both purposes of power supply (driving) and signal transmission, even if noise of a strong electric field, a strong magnetic field wave and the like occurs, the invasion of the noise to the transmission line connecting a remote place can be almost securely prevented. With the improvement of the noise resistant property, the malfunction of the sensor head and the measuring device and the lowering of a measuring accuracy can be previously prevented and reliability is improved. Since power consumed by the sensor head is on an order of microwatt, an excellent explosion-proof property can be also obtained. Further, even if an accident of the falling of a thunderbolt happens, there is almost no fear of the damage of the sensor head. Since measurement is carried out through a pulse signal produced by an intermittent light, a change of an amount of light which is caused by an environmental change such as a different length of optical fibers and a change in temperature has almost no direct influence on a measuring accuracy.

Note, although the resonance circuit type stress measuring system in the third embodiment is arranged by using the single set of the sensor head and the single set of the measuring device, the same modification as that of the second embodiment can be also made with respect to this system. That is, in this case, a plurality of stress meters each having a combination of a light distributer and a resonance circuit type sensor head are connected in series to the single set of the measuring device on a multi-stage base. With this arrangement, a plurality of desired sensing locations can be processed by the single set of the measuring device as well as the number of optical fibers to be connected can be greatly reduced, so that the system can be miniaturized.

Although a light pulse signal of the driving optical fiber is used for both of a sensor exciting purpose and a light emitting diode driving purpose, a light signal for driving the light emitting diode may be transmitted by means of a third optical fiber which is separately provided in the same way as the first embodiment.

As described above, according to the stress measuring system of the present invention, the sensor head for remote measurement is connected to the measuring device through the closed loop of a light pulse and both of sensor driving energy and a sensing signal which are sent and received therebetween are transmitted in the state of a light pulse signal through light transmission means such as optical fibers and the like as well as the sensor simultaneously executes the sensing of stress and light pulse conversion.

As a result, since the measuring is not subjected to an adverse effect due to a change in temperature in the environment including the mounting location of the sensor head and to the effect of a strong electric field and a strong magnetic filed, the invasion of the noise of them can be eliminated, so that stress can be measured at a pinpoint accuracy. Further, the damage of the sensor head and the like and the malfunction of the system due to the falling of a thunderbolt and the like can be also prevented, whereby reliability of the system can be improved.

Since stress is sensed and a light pulse is converted simultaneously, an additional pulse conversion circuit and the like need not be provided, by which the circuit arrangement of the sensor head is greatly miniaturized and simplified. Further, since driving power and signals are optically transmitted through the optical fibers and the like, a shield, a noise eliminating circuit and the like for eliminating the invasion of noise are not necessary, whereby the overall system can be miniaturized and simplified and the cost of the system can be reduced.

Since the sensor head is driven by a light signal and directly produces a light pulse signal, the sensor head does not generate an electric spark as in the case of an electric type sensor. Thus, the sensor head can execute measurement in the vicinity of a flammable material such as oil, gas and the like as it is without the need of employing an explosion-proof design and a countermeasure for insulation which lead to an increase of size and cost.

What we claim is:

1. A system for measuring stress comprising:
   a sensor head, disposed at a sensing location receiving a stress, incorporating a sensing means having an oscillation string oscillating mechanically at a changeable natural frequency and for sensing a change in the stress as a change in the natural frequency of the oscillation string, an output means for outputting a light pulse sensing signal corresponding to the natural frequency sensed by the sensing means, and a driving means for causing oscillation of the oscillation string in response to a driving light pulse signal;
   a measuring device, disposed at a location remote from the sensing location, incorporating a measuring means for measuring the stress based on a frequency of the light pulse sensing signal and a creating means for creating the driving light pulse signal of a frequency following in real time a change in the natural frequency of the oscillation string based on the light pulse sensing signal; and
   light transmission means for transmitting at least the light pulse sensing signal and the driving light pulse signal between the sensor head and the measuring device,
   wherein said driving means comprises a photoelectric converter for converting the driving light pulse signal transmitted through the light transmission means to an electric pulse signal, an electromagnet which is pulse-excited by the electric pulse signal, and a shutter member for mechanically oscillating the oscillation string in response to a pulse excitation of the electromagnet, said shutter member being a disk at a radial center of which the oscillation string fixedly passes through and being arranged to form the light pulse sensing signal.

2. A system for measuring stress according to claim 1, wherein said sensor head has a body case sensible to the stress, the oscillation string being stretched to the body case.

3. A system for measuring stress according to claim 2, wherein said body case includes a cylindrical body portion having a bottom, a stress sensing section being formed at an end facing the bottom and sensing the stress, and a flexible portion intervening between the cylindrical body portion and the stress sensing section and wherein said oscillation string is stretched between the bottom and the stress sensing section.

4. A system for measuring stress according to claim 2, wherein said oscillation string is composed of a material approximately equal in a coefficient of at least a linear expansion of the body case.

5. A system for measuring stress according to claim 1, wherein said output means comprises means for forming a light path along which a sensing light signal of a constant amplitude is transmitted and said shutter member is arranged in the light path so as to interrupt the light path and form the light-pulse sensing signal.

6. A system for measuring stress according to claim 5, wherein said measuring device further comprises a light signal generating means for generating the sensing light signal and said light transmission means comprises three optical fibers each transmitting each of the sensing light signal, the driving light pulse signal, and the light pulse sending signal between the sensor head and the measuring device.

7. A system for measuring stress according to claim 1, wherein said measuring means and said creating means include a common phase lock loop circuit receiving the light pulse sensing signal and producing the driving light pulse signal used for measurement of the stress and the oscillation of the oscillation string.

8. A system for measuring stress comprising a plurality of sensor heads, disposed at a plurality of sensing locations receiving a stress, each of which incorporates a sensing means having an oscillation string oscillating mechanically at a changeable natural frequency and for sensing a change in the stress as a change in the natural frequency of the oscillation string, an output means for outputting a light pulse sensing signal corresponding to the natural frequency sensed by the sensing means, and a driving means for causing oscillation of the oscillation string in response to a driving light pulse signal;
   a single measuring device, disposed at a location remote from the plurality of sensing locations, incorporating a measuring means for measuring the stress based on a frequency of the light pulse sensing signal and a creating means for creating the driving light pulse signal of a frequency following in real time a change in the natural frequency of the oscillation string based on the light pulse sensing signal; and light transmission means for transmitting at least the light pulse sensing signal and the driving light pulse signal between each of the plurality of sensor heads and the measuring device, said plurality of sensor heads being connected in multi-stage by the light transmission means, wherein said driving means comprises a photoelectric converter for converting the driving light pulse signal transmitted through the light transmission means to an electric pulse signal, an electromagnet which is pulse-excited by the electric pulse signal, and a shutter member for mechanically oscillating the oscillation string in response to a pulse excitation of the electromagnet, said shutter member being a disk at a radial center of which the oscillation string fixedly passes through and being arranged to form the light pulse sensing signal.

9. A system for measuring stress according to claim 8, wherein said output means comprises means for forming a light path along which a sensing light signal of a constant amplitude is transmitted and said shutter member is arranged in the light path so as to interrupt the light path and form the light pulse sensing signal.

10. A system for measuring stress comprising:

a sensor head, disposed at a sensing location receiving a stress, incorporating a sensing means, having an oscillation system having a changeable natural frequency, for sensing a change in the stress as a change in the natural frequency of the oscillation system, an output means for outputting a light pulse sensing signal corresponding to the natural frequency sensed by the sensing means, wherein said oscillation system is an oscillation string oscillating mechanically and said sensor head has a body case sensitive to the stress, the oscillation string being stretched to the body case, and a driving means for causing oscillation of the oscillation system in response to driving energy reproduced by a driving light pulse signal, wherein said driving means comprises a photoelectric converter for converting the driving light pulse signal transmitted through the light transmission means to an electric pulse signal, an electromagnet pulse-excited by the electric pulse signal, and a shutter member for directly applying a mechanical oscillation to the oscillation string in response to a pulse excitation of the electromagnet, wherein said shutter member is a disk at a radial center of which the oscillation string fixedly passes through;

a measuring device, disposed at a location remote from the sensing location, incorporating a measuring means for measuring the stress based on a frequency of the light pulse sensing signal and a creating means for creating the driving light pulse signal of a frequency following in real time a change in the natural frequency of the oscillation system based on the light pulse sensing signal; and light transmission means for transmitting at least the light pulse sensing signal and the driving light pulse signal between the sensor head and the measuring device.

* * * * *